(12) United States Patent
Kalina

(10) Patent No.: US 7,458,217 B2
(45) Date of Patent: Dec. 2, 2008

(54) SYSTEM AND METHOD FOR UTILIZATION OF WASTE HEAT FROM INTERNAL COMBUSTION ENGINES

(75) Inventor: Alexander I. Kalina, Hillsborough, CA (US)

(73) Assignee: Kalex, LLC, Belmont, CA (US)

( * ) Notice: Subject to any disclaimer, the term of this patent is extended or adjusted under 35 U.S.C. 154(b) by 378 days.

(21) Appl. No.: 11/227,991

(22) Filed: Sep. 15, 2005

(65) Prior Publication Data

US 2007/0056284 A1 Mar. 15, 2007

(51) Int. Cl.
*F01K 23/10* (2006.01)

(52) U.S. Cl. ............................. 60/618; 60/649; 60/651; 60/653; 60/671

(58) Field of Classification Search .................. 60/649, 60/651, 653, 671, 673, 618
See application file for complete search history.

(56) References Cited

U.S. PATENT DOCUMENTS

| | | | | |
|---|---|---|---|---|
| 3,888,084 A * | 6/1975 | Hawkins | ........................ | 60/614 |
| 4,733,536 A * | 3/1988 | DiBella et al. | ................. | 60/618 |
| 6,735,948 B1 | 5/2004 | Kalina | .......................... | 60/649 |
| 6,769,256 B1 | 8/2004 | Kalina | .......................... | 60/653 |
| 6,820,421 B2 | 11/2004 | Kalina | .......................... | 60/649 |
| 6,829,895 B2 | 12/2004 | Kalina | .......................... | 60/649 |
| 6,910,334 B2 | 6/2005 | Kalina | .......................... | 60/651 |
| 6,923,000 B2 | 8/2005 | Kalina | .......................... | 60/649 |
| 6,941,757 B2 | 9/2005 | Kalina | .......................... | 60/649 |
| 6,968,690 B2 | 11/2005 | Kalina | .......................... | 60/649 |
| 7,021,060 B1 | 4/2006 | Kalina | .......................... | 60/649 |
| 7,043,919 B1 | 5/2006 | Kalina | .......................... | 60/651 |
| 7,055,326 B1 | 6/2006 | Kalina | .......................... | 60/649 |
| 7,065,967 B2 | 6/2006 | Kalina | .......................... | 60/649 |
| 7,065,969 B2 | 6/2006 | Kalina | .......................... | 60/670 |
| 2005/0061654 A1 | 3/2005 | Kalina | .......................... | 203/21 |
| 2006/0096288 A1 | 5/2006 | Kalina | .......................... | 60/649 |
| 2006/0096289 A1 * | 5/2006 | Kalina | .......................... | 60/649 |
| 2006/0096290 A1 | 5/2006 | Kalina | .......................... | 60/649 |
| 2006/0165394 A1 | 7/2006 | Kalina | .......................... | 392/386 |
| 2006/0199120 A1 | 9/2006 | Kalina | .......................... | 431/9 |
| 2007/0068161 A1 * | 3/2007 | Kalina | .......................... | 60/651 |
| 2007/0234722 A1 * | 10/2007 | Kalina | .......................... | 60/645 |
| 2008/0000225 A1 * | 1/2008 | Kalina | .......................... | 60/517 |

FOREIGN PATENT DOCUMENTS

FR 2885169 11/2006

(Continued)

OTHER PUBLICATIONS

U.S. Appl. No. 11/514,290, filed Aug. 31, 2006, Kalina.

(Continued)

*Primary Examiner*—Hoang M Nguyen
(74) *Attorney, Agent, or Firm*—Robert W. Strozier

(57) ABSTRACT

A system and method is disclosed to increase the efficient of internal combustion engines where the system and method converts a portion of thermal energy produced in the combustion process to a usable form of energy. If the engines are used in power generation, then the system and method increases the power output of the engine significantly. If the engines are used in traditional mechanical operations such as ships, then the system and method operates to increase mechanical power output or to increase co-produced electrical energy output.

20 Claims, 3 Drawing Sheets

FOREIGN PATENT DOCUMENTS

| WO | WO0165101 | 9/2001 |
|---|---|---|
| WO | WO03048529 | 6/2003 |
| WO | WO2004102082 | 11/2004 |

OTHER PUBLICATIONS

U.S. Appl. No. 11/399,287, filed Apr. 5, 2006, Kalina.
U.S. Appl. No. 11/399,306, filed Apr. 5, 2006, Kalina.
U.S. Appl. No. 11/238,173, filed Sep. 28, 2005, Kalina.
U.S. Appl. No. 11/235,654, filed Sep. 22, 2005, Kalina.
PCT ISR.
PCT Written Opinion.
Furuhama et al. "Rankine Cycle Engines for Utilizationof LH2 Car Fuel as a Low-Temperature Source", 1993 International Association for Hydrogen Energy, p. 14-155. XP000346164.
Leibowitz et al. Installation and Early Test Results of a 3 MW Kalina Cycle Demonstration Plant, Pub. Date: Mar. 8, 1992, Stone & Webster Engrg. Corp., pp. 3.35-3.42. XP000392711.

* cited by examiner

US 7,458,217 B2

SYSTEM AND METHOD FOR UTILIZATION OF WASTE HEAT FROM INTERNAL COMBUSTION ENGINES

BACKGROUND OF THE INVENTION

1. Field of the Invention

The present invention relates to the utilization of waste heat from diesel or other types of internal combustion engines used in power generation.

More particularly, the present invention relates to utilizing waste heat from diesel or similar types internal combustion engines used for power generation, where the fuel is relatively clean permitting the cooling of the exhaust gases from the engine to relatively low temperatures.

2. Description of the Related Art

A specific characteristic of diesel engines or other similar internal combustion engines used for power generation is that these system have two sources of waste heat: the waste heat from the exhaust gases formed during the combustion process and the waste heat from the water or other coolants used to cool the engine.

The utilization of heat from exhaust gas can be done in many different ways, and in general can be done with a conventional type of bottoming cycle. However, the utilization of both heat sources (exhaust gases and coolant—water or water antifreeze mixtures) in the same system has the potential to deliver substantial advantages.

Thus, not only is there an need in the art for more efficient and effective means for extracting usable work from waste heat generated by internal combustion engines; there is also a need in the art for solutions that operate within the confines of the heat sources available in such engines.

SUMMARY OF THE INVENTION

The present invention provides a system including an internal combustion engine, a heat recovery vapor generator (HRVG) connected to the exhaust of the engine and designed to utilized the heat in the exhaust gases to fully vaporize a multi-component working fluid, a turbine connected to the HRVG for converting a portion of thermal energy in the working fluid to a usable form of energy, and a condensation thermal compression subsystem (CTCSS) connected to the turbine and to a coolant system of the engine and designed to fully condense the working fluid and to lower back pressure on the turbine. The system converts a portion of heat from the exhaust gases and from the coolant used to cool the internal combustion engine to a usable form of energy. The system of this invention can be used by one or a plurality of internal combustion engines where the exhausts are combined and forwarded to the HRVG and the hot coolant streams from the engines are combined and sent to the CTCSS to assist in the condensation thermal compression process.

The present invention also provides an apparatus including an internal combustion engine having an exhaust system and a cooling system. The apparatus also includes a heat recovery vapor generator (HRVG) connected to the exhaust system and designed to transfer a portion of heat in engine exhaust gases to fully vaporize a fully condensed multi-component working fluid and a turbine connected to the HRVG and designed to convert a portion of heat from the fully vaporized working fluid to a usable form of energy. Preferably, the working fluid is also superheated. The apparatus also includes a condensation thermal compression subsystem (CTCSS) connected to the turbine and to the cooling system and designed to receive a spent working fluid and fully condense the spent working fluid for re-circulation back to the HRVG. The HRVG includes a series of heat exchange stages which successively heat the fully condensed working fluid until it is fully vaporized and preferably superheated. The CTCSS includes a plurality of heat exchangers, at least one separator, at least one throttle valve, at least two pumps, a plurality of dividing and combining valves and sufficient piping to interconnect the components in the CTCSS design of FIG. 3.

The present invention provides a method for converting a portion of waste thermal energy generated by an internal combustion engine into a usable form of energy such as electrical energy, mechanical energy or electro-mechanical energy—work. The method includes the step of combustion a relatively clean fuel in an internal combustion engine including an exhaust system and a cooling system. The term relatively clean means that the fuel is a fuel approved for use as a fuel in internal combustion engines, such as diesel engines, used in power generation, or a fuel that is cleaner than fuel approved for use in such engines, such as clean diesel or bio-diesel. The method also includes the step of directing the exhaust gas into a heat exchange relationship with a fully condensed, multi-component working fluid in a heat recovery vapor generator (HRVG). The HRVG includes several heat exchange stages resulting in the complete vaporization of the fully condensed, multi-component working fluid and preferably, the superheating of the vaporized working fluid. The method also include the step of converting a portion of thermal energy in the fully vaporized and preferably, superheated working fluid by passing the fluid through a turbine to a usable form of energy. The method also includes the step of passing a spent working fluid through a condensation thermal compression subsystem (CTCSS), where the working fluid is fully condensed using an external coolant and heat from the coolant in the cooling system of the engine.

The present invention also provides a method for condensing a spent working fluid including the step of passing the spent fluid stream form the turbine through a first heat exchanger where a portion of its heat is transferred to a first portion of a heated, leaner working fluid stream to form a first partially vaporized leaner working fluid steam and a cooled working fluid stream. The first partially vaporized leaner working fluid stream is combined, with a second partially vaporized leaner working fluid stream to form a combined partially vaporized which is then separated in a separator into a rich vapor stream and a lean liquid stream. The lean liquid stream is passed through a throttle valve where its pressure is adjust to be the same or substantially the same to a pressure of the cooled working fluid stream. The term substantially the same means that the pressure difference is small and does not cause design and operational problems. Generally, the difference should be less tan about 10%, preferably less than about 5% and particularly less than about 2%. The pressure adjusted lean liquid stream is then combined with the cooled working fluid steam to form a leaner working fluid stream. The leaner working fluid stream is then brought into heat exchange relationship with a first portion of a pressurized liquid enriched working fluid stream to form the heated, enriched working fluid stream and a partially condensed leaner working fluid stream. The partially condense leaner working fluid stream is then fully condensed in heat exchange relationship with a coolant in a condenser to form a fully condensed or liquid leaner working fluid stream. The liquid leaner working fluid stream is then pressurized to form a pressurized liquid leaner working fluid stream. The pressurized liquid enriched working fluid stream is then divided into the first portion of the pressurized liquid leaner working fluid stream and a second portion of the pressurized liquid leaner working fluid stream.

The second portion of the pressurized liquid leaner working fluid stream is then combined with the rich vapor stream to form a partially condensed working fluid stream. The partially condensed working fluid stream is then fully condensed in heat exchange relationship with a coolant in a high pressure condenser to form a fully condensed working fluid stream. The fully condensed working fluid stream is then sent through a feed pump where its pressure is raised to a desired level and forwarded to the HRVG where it is vaporized by the internal combustion engine exhaust for the conversion of a portion of the exhaust's thermal energy into electrical work..

Although the systems and methods of this invention are directed primarily to internal combustion engines for power generations, especially diesel engines, the systems and methods of this invention can also be used to extract more energy from internal combustion engines, especially, engines on ships an other vessels or vehicles that are large enough to accommodate the equipment necessary for the implement the HRVG and CTCSS of this invention.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

The inventors have found that a secondary energy extraction system can be added onto an existing internal combustion engine to extract an additional amount of work from waste heat produced by the engine in the form of the exhaust gases and in turn of hot water formed in the cooling system. The secondary energy extraction system includes a heat recovery vapor generator designed to vaporize and preferably superheat a multi-component working fluid using heat from the internal combustion engine. The system also includes a turbine for converting a portion of heat from the vaporized working fluid into a usable form of energy and a condensation thermal compression subsystem for condensing the working fluid from the turbine into a fully condensed working fluid. The condensation thermal compression subsystem also uses hot water from the internal combustion engine cooling system to assist in the condensation of the spent working fluid.

The system of this invention uses as its working fluid including a mixture of at least two components, where the components have different normal boiling temperatures. That is the working fluid is a multi-component fluid including at least one higher boiling component and at least one lower boiling component. In a two component working fluid, the higher boiling component is often referred to simply as the high boiling component, while the lower boiling component is often referred to simply as the low boiling component. In the CTCSS of this system, the composition of the multi-component working fluid is in the CTCSS to accomplish the condensation of the spent working fluid. The CTCSS utilizes four different working fluid compositions to efficiency condense the spent working fluid.

The working fluid used in the systems of this inventions is a multi-component fluid that comprises a lower boiling point material—the low boiling component—and a higher boiling point material—the high boiling component. Preferred working fluids include, without limitation, an ammonia-water mixture, a mixture of two or more hydrocarbons, a mixture of two or more freons, a mixture of hydrocarbons and freons, or the like. In general, the fluid can comprise mixtures of any number of compounds with favorable thermodynamic characteristics and solubilities. In a particularly preferred embodiment, the fluid comprises a mixture of water and ammonia.

Suitable fuels for use in this invention include, without limitation, any fuel that can be burned in an internal combustion engine without causing exhaust system clogging or does not produce high levels of solids. Exemplary examples of such fuels include diesel fuels, bio-diesel fuels, clean diesel fuels, jet fuels, heavier or littler hydrocarbon cuts, or mixtures or combinations thereof.

Figure 1:
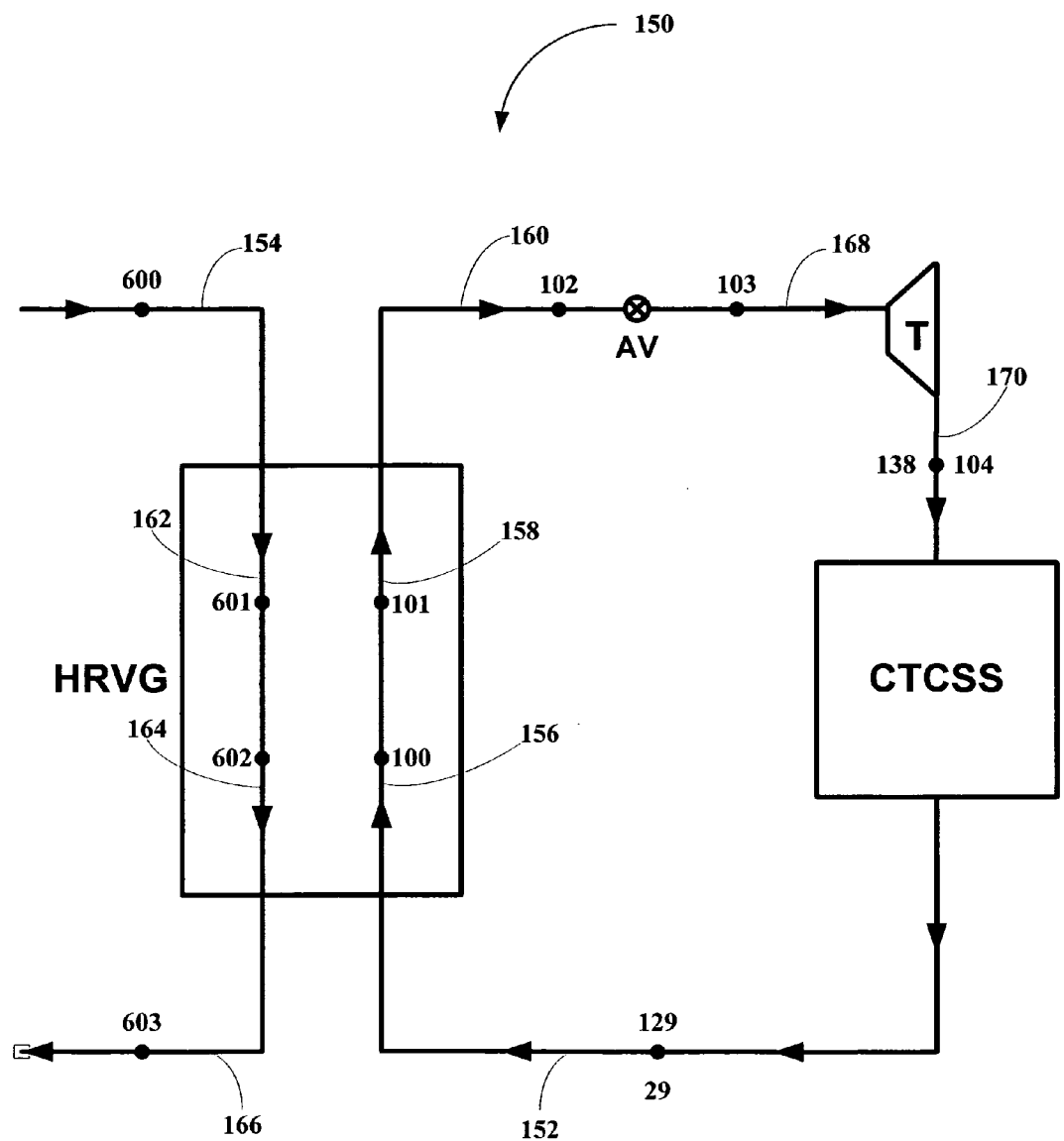
FIG. 1 depicts an expanded view of a preferred embodiment of a secondary energy extraction system for converting a portion of the heat generated by an internal combustion engine into usable work.

Referring now to FIG. 1, a preferred embodiment of the heat utilization system of this invention, generally 150, is shown to include a heat recovery vapor generator HRVG and a condensation thermal compression subsystem CTCSS. In the HRVG, a fully condensed working fluid is vaporized and energy from the vaporized working fluid is passed through an admission valve TV and through a turbine T, where a portion of the thermal energy in the fluid is extracted and converted to a usable from of energy. The spent fluid is then sent to the CTCSS, where it is fully condensed completing the cycle.

In particular, a stream 152 fully condensed working fluid having a desired high pressure and other parameters as at a point 129, which corresponds to a point 29 described below in the CTCSS section, enters the HRVG, where it is heated in counterflow to a stream of exhaust gas 154 having initial parameters as at a point 600. The working fluid stream 152 is heated to form a heated stream 156 having parameters as at a point 100, which corresponding to a state of saturated liquid. The stream 156 having the parameters as at the point 100 is thereafter fully vaporized to form a stream 158 having parameters as at a point 101, which corresponding to a state of saturated vapor. The stream 158 of working fluid having the parameters as at the point 101 is then superheated to form a stream 160 having parameters as at a point 102.

Simultaneously, the exhaust gas stream 154 having the initial parameters as at the point 600, moving in counterflow to the stream 158 of working fluid having the parameters as at the point 101, is cooled to form a cooled flue gas stream 162 having parameters as at a point 601, providing heat for the process of superheating the working fluid stream 158 to the stream 160 in a first heat exchange process 101-102. Thereafter, the cooled flue gas 162 having the parameters as at the point 601 is further cooled to form a further cooled flue gas stream 164 having parameters as at a point 602, providing heat for the vaporization of the working fluid stream 154 in a second heat exchange process 100-101. Thereafter, the flue gas stream 164 having the parameters as at the point 602 is further cooled to form a spent flue gas stream 166 having parameters as at a point 603, providing heat for preheating of the working fluid stream 152 in a third heat exchange process 129-100. The spent flue gas stream 166 is then removed from the system 150.

The superheated working fluid stream 160 having the parameters as at the point 102 then passes through the admission valve AV, where its pressure may be reduced to form a stream 168 having parameters as at a point 103, and thereafter enters into the turbine T. The working fluid stream 168 having the parameters as at the point 103 is expanded in the turbine T converting a portion of its thermal energy into useful work to form a spent working fluid stream 170 having obtains parameters as at a point 104. The spent working fluid stream 170 having the parameters as at the point 104 is then re-designated as a point 138 becoming the initial feed stream to the CTCSS.

The spent working fluid stream 170 exiting the turbine and having the parameters as at the point 138 then enters the CTCSS, where it is again re-designated as an initial CTCSS stream 200 having parameters as at a stream 38.

Figure 2:
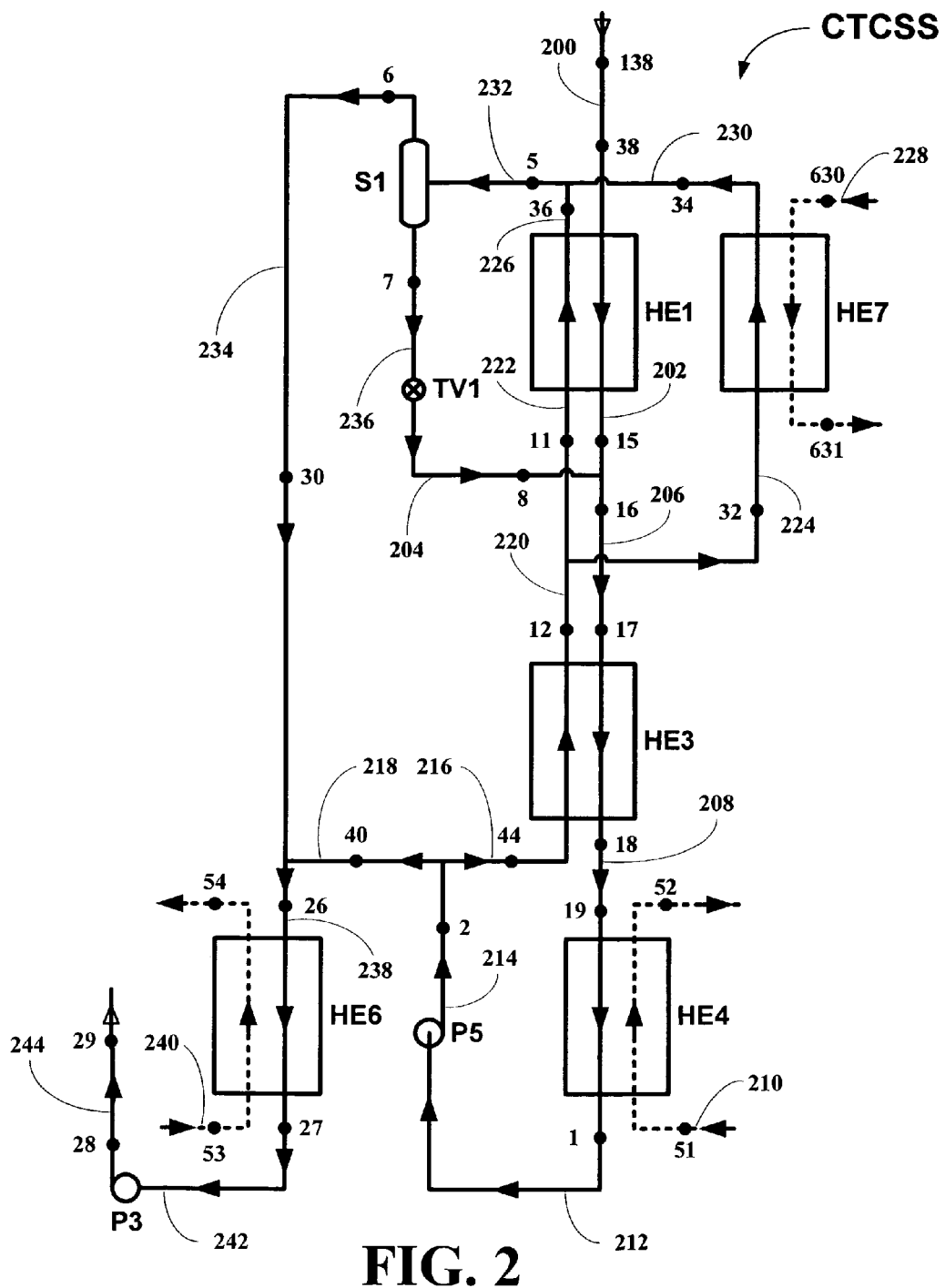
FIG. 2 depicts a preferred embodiment of a condensation thermal compression subsystem of this invention.

Referring now to FIG. 2, the CTCSS of FIG. 1 is shown and described in terms of its operation. The stream 200 having the parameters as at the point 38 passes through a first heat exchanger HE1, where it is cooled and partially condensed forming a cooled stream 202 having parameters as at a point 15 and releasing heat in a first CTCSS heat exchange process 38-15 or 11-36. Then, the stream 202 having the parameters as at the point 15 is mixed with a stream 204 having parameters as at a point 8. As a result of this mixing, a stream 206 having parameters as at a point 17 is formed. A concentration of a lower boiling component of the multi-component working fluid such as ammonia of a water/ammonia working fluid in the stream 206 having the parameters as at the point 17 is such that it can be fully condensed at ambient temperature.

The stream 206 having the parameters as at the point 17 then passes through a second heat exchanger HE3, where it is further cooled and condensed to form a partially condensed stream 208 having parameters as at a point 18 releasing heat in a second CTCSS heat exchange process 17-18 or 44-12. The stream 208 having the parameters as at the point 18 then passes through a low pressure condenser HE4, where it is fully condensed, in counterflow with a stream of coolant 210 in a third CTCSS heat exchange process 18-1 or 51-52 to form a fully condensed stream 212 having parameters as at a point 1, which corresponds to a state of saturated liquid. The coolant stream 210 is generally water or air having initial parameters as at a point 51 and final parameters as at a point 52.

The stream 212 having the parameters as at the point 1 then enters into a circulation pump P5, where its pressure is raised forming a higher pressure stream 214 having parameters as at a point 2. The stream 214 having the parameters as at the point 2 is then divided into two substreams 216 and 218 having parameters as at points 44 and 40, respectively.

The substream 216 having the parameters as at the point 44, which is in a state of subcooled liquid, then passes through the second heat exchanger HE3, where it is heated in counterflow with the stream 206 in the second CTCSS heat exchange process 44-12 or 17-18 as described above to form a heated stream 220 having parameters as at a point 12, which corresponds or close to a state of saturated liquid. The stream 220 having the parameters as at the point 12 is then divided into two substreams 222 and 224 having parameters as at points 11 and 32, respectively.

The substream 222 having the parameters as at the point 11 then passes through the first heat exchanger HE1, where it is heated and partially vaporized in counterflow with stream 200 in the first CTCSS heat exchange process 11-36 or 38-15 as described above to form a mixed stream 226 having parameters as at a point 36.

Meanwhile, the stream 224 having the parameters as at the point 32 passes through a third heat exchanger HE7, where it is heated and partially vaporized, in counterflow with a stream of hot water 228 in fourth CTCSS heat exchange process 32-34 or 630-631 to obtain a stream 230 having parameters as at a point 34. The hot water stream 228 has initial parameters as at a point 630 and final parameters as at a point 631.

Thereafter, the streams 226 and 230 having the parameters as at the points 36 and 34, respectively, are combined forming a combined stream 232 having parameters as at a point 5. The stream 232 having the parameters as at the point 5 then enters into a separator S1, where it is separated into a stream of saturated vapor 234 having with parameters as at a point 6 and a stream of saturated liquid 236 having the parameters as at a point 7.

The liquid stream 236 having the parameters as at point 7 then passes through a throttle valve TV1, where its pressure is reduced to a pressure equal to a pressure of the stream 202 having the parameters as at the point 15, as described above, to form the lower pressure stream 204 having the parameters as at the point 8. The stream 204 having the parameters as at the point 8 is then mixed with the stream 202 having the parameters as at the point 15 forming the stream 206 having the parameters as at the point 17 as described above.

Meanwhile, the stream 234 having the parameters as at the point 6 is then mixed with the stream 218 having the parameters as at the point 40 as described above forming a stream 238 with parameters as at a point 26. The composition and flow rate of stream 238 having the parameters as at the point 26 are the same as the stream 200 having the parameters at the point 38. The stream 238 having the parameters as at the point 26 then passes through a high pressure condenser HE6, where it fully condensed in counterflow by a stream of coolant 240 in fifth CTCSS heat exchange process 26-27 or 53-54 to form a stream 242 having parameters as at a point 27, corresponding to a state of saturated liquid. The coolant stream 240 is generally water or air having initial parameters as at a point 53 and final parameters as at a point 54. It should be recognized that the coolant streams 210 and 240 can be the same stream or from the same source.

Thereafter, the stream 242 of working fluid having the parameters as at the point 27 enters into a feed pump P3, where its pressure is raised to a necessary level to form a CTCSS discharge stream 244 having parameters as at a point 29. The stream 244 having the parameters as at the point 29 is then sent into the HRVG and is renumber as the stream 152 having the parameters as at the point 129 of FIG. 1.

Generally, the temperatures of the stream 232, 234 and 236 having the parameters as at the points 5, 6 and 7, respectively are chosen in such a way that the liquid stream 236 having the parameters as at the point 7. The stream 236 having the parameters as at the point 7 is then throttled in the throttle valve TV1, forming the stream 204 having a temperature, which is equal or very close to the temperature the stream 202 having the parameters as at the point 15. This is an important feature of the design of this invention, because it allows for increased efficiency of the operation of the CTCSS.

In the flow diagram of CTCSS, several additional points 16, 19, 28, and 30 are shown, and the parameters of those points are presented in Table 1. These points exist because the computational diagram of the CTCSS required several additional state points; however, these extra points should be disregarded.

The performance of the system of this invention has been calculated assuming the exhaust and cooling water flow of a 3 MW diesel engine.

The parameters of all key points of the proposed system are presented in Table 1, and a summary of system performance is presented in Table 2.

Due to the fact that the system of this invention integrates the utilization of both heat from exhaust gas and from cooling water, it provides a high efficiency of utilization of exhaust gas from diesel engines.

TABLE 1

System Point Summary
Ammonia/Water Working Fluid Simple Boiler, Fixed Inlet Pressure

| Pt. | X lb/lb | T F | P psia | H Btu/lb | S Btu/lb-R | Ex Btu/lb | Grel G/G = 1 | Gabs lb/h | Ph. | Wetness/T lb/lb/F. |
|---|---|---|---|---|---|---|---|---|---|---|
| | | | | | Working Fluid | | | | | |
| 1 | 0.5110 | 60.80 | 35.670 | −77.8236 | 0.0030 | 0.3524 | 3.47220 | 42,206 | Mix | 1 |
| 2 | 0.5110 | 61.03 | 104.591 | −77.3966 | 0.0033 | 0.6001 | 3.47220 | 42,206 | Liq | −59° F. |
| 4 | 0.5110 | 61.03 | 104.591 | −77.3966 | 0.0033 | 0.6001 | 0.20826 | 2,531 | Liq | −59° F. |
| 5 | 0.5110 | 162.50 | 97.591 | 182.8350 | 0.4487 | 29.8443 | 3.26394 | 39,674 | Mix | 0.7574 |
| 6 | 0.9707 | 162.50 | 97.591 | 628.4219 | 1.2068 | 84.2718 | 0.79174 | 9,624 | Mix | 0 |
| 7 | 0.3638 | 162.50 | 97.591 | 40.1327 | 0.2059 | 12.4136 | 2.47220 | 30,051 | Mix | 1 |
| 8 | 0.3638 | 121.97 | 38.670 | 40.1327 | 0.2098 | 10.3919 | 2.47220 | 30,051 | Mix | 0.9358 |
| 11 | 0.5110 | 116.97 | 99.591 | −15.0197 | 0.1171 | 3.9558 | 1.46129 | 17,762 | Liq | 0° F. |
| 12 | 0.5110 | 116.97 | 99.591 | −15.0197 | 0.1171 | 3.9558 | 3.26394 | 39,674 | Mix | 1 |
| 15 | 0.8750 | 121.97 | 38.670 | 520.5509 | 1.1123 | 24.9951 | 1.00000 | 12,155 | Mix | 0.1506 |
| 16 | 0.5110 | 121.97 | 38.670 | 178.4940 | 0.4697 | 14.5976 | 3.47220 | 42,206 | Mix | 0.7096 |
| 17 | 0.5110 | 121.97 | 38.670 | 178.4940 | 0.4697 | 14.5976 | 3.47220 | 42,206 | Mix | 0.7096 |
| 18 | 0.5110 | 104.72 | 37.670 | 119.8584 | 0.3681 | 8.6423 | 3.47220 | 42,206 | Mix | 0.7688 |
| 19 | 0.5110 | 104.72 | 37.670 | 119.8584 | 0.3681 | 8.6423 | 3.47220 | 42,206 | Mix | 0.7688 |
| 24 | 0.9707 | 162.50 | 97.591 | 628.4219 | 1.2068 | 84.2718 | 0.79174 | 9,624 | Mix | 0 |
| 25 | 0.9707 | 162.50 | 97.591 | 628.4219 | 1.2068 | 84.2718 | 0.79174 | 9,624 | Vap | 0° F. |
| 26 | 0.8750 | 136.76 | 97.591 | 481.4280 | 0.9600 | 64.8586 | 1.00000 | 12,155 | Mix | 0.2065 |
| 27 | 0.8750 | 60.80 | 95.591 | −9.3244 | 0.0476 | 47.3414 | 1.00000 | 12,155 | Mix | 1 |
| 28 | 0.8750 | 67.49 | 1,952.000 | 1.8623 | 0.0533 | 55.5466 | 1.00000 | 12,155 | Liq | −255.1° F. |
| 29 | 0.8750 | 67.49 | 1,952.000 | 1.8623 | 0.0533 | 55.5466 | 1.00000 | 12,155 | Liq | −255.1° F. |
| 30 | 0.9707 | 162.50 | 97.591 | 628.4219 | 1.2068 | 84.2718 | 0.79174 | 9,624 | Mix | 0 |
| 32 | 0.5110 | 116.97 | 99.591 | −15.0197 | 0.1171 | 3.9558 | 1.80266 | 21,912 | Liq | 0° F. |
| 34 | 0.5110 | 189.00 | 97.591 | 275.4204 | 0.5944 | 46.8462 | 1.80266 | 21,912 | Mix | 0.6614 |
| 36 | 0.5110 | 132.92 | 97.591 | 68.6217 | 0.2604 | 13.2681 | 1.46129 | 17,762 | Mix | 0.8893 |
| 38 | 0.8750 | 161.43 | 39.670 | 642.7749 | 1.3123 | 43.4924 | 1.00000 | 12,155 | Mix | 0.0422 |
| 40 | 0.5110 | 61.03 | 104.591 | −77.3966 | 0.0033 | 0.6001 | 0.20826 | 2,531 | Liq | −59° F. |
| 44 | 0.5110 | 61.03 | 104.591 | −77.3966 | 0.0033 | 0.6001 | 3.26394 | 39,674 | Liq | −59° F. |
| 100 | 0.8750 | 321.92 | 1,944.000 | 352.4457 | 0.5845 | 130.6245 | 1.00000 | 12,155 | Mix | 1 |
| 101 | 0.8750 | 389.66 | 1,928.000 | 645.8535 | 0.9471 | 235.9619 | 1.00000 | 12,155 | Mix | 0 |
| 102 | 0.8750 | 687.00 | 1,920.000 | 933.9828 | 1.2437 | 370.2921 | 1.00000 | 12,155 | Vap | 297.4° F. |
| 103 | 0.8750 | 686.22 | 1,900.000 | 933.9828 | 1.2447 | 369.7253 | 1.00000 | 12,155 | Vap | 296.9° F. |
| 104 | 0.8750 | 161.43 | 39.670 | 642.7749 | 1.3123 | 43.4924 | 1.00000 | 12,155 | Mix | 0.0422 |
| 129 | 0.8750 | 67.49 | 1,952.000 | 1.8623 | 0.0533 | 55.5466 | 1.00000 | 12,155 | Liq | −255.1° F. |
| 138 | 0.8750 | 161.43 | 39.670 | 642.7749 | 1.3123 | 43.4924 | 1.00000 | 12,155 | Mix | 0.0422 |
| | | | | | Heat Source | | | | | |
| 600 | GAS | 707.00 | 14.933 | 258.5173 | 0.4143 | 65.3755 | 6.14548 | 74,701 | Vap | 585° F. |
| 601 | GAS | 533.88 | 14.919 | 211.6325 | 0.3709 | 41.0108 | 6.14548 | 74,701 | Vap | 411.9° F. |
| 602 | GAS | 353.19 | 14.664 | 163.8888 | 0.3190 | 20.1445 | 6.14548 | 74,701 | Vap | 231.8° F. |
| 603 | GAS | 132.17 | 14.650 | 106.8414 | 0.2372 | 5.5190 | 6.14548 | 74,701 | Vap | 10.8° F. |
| 630 | Water | 194.00 | 24.693 | 162.2393 | 0.2851 | 15.1053 | 9.66880 | 117,528 | Liq | −45.36° F. |
| 631 | Water | 140.00 | 14.693 | 108.0895 | 0.1987 | 5.7742 | 9.66880 | 117,528 | Liq | −71.95° F. |
| | | | | | Coolant | | | | | |
| 50 | Water | 51.70 | 14.693 | 19.8239 | 0.0394 | 0.0948 | 14.8938 | 181,040 | Liq | −160.25° F. |
| 51 | Water | 51.80 | 24.693 | 19.9498 | 0.0396 | 0.1232 | 14.8938 | 181,040 | Liq | −187.56° F. |
| 52 | Water | 97.92 | 14.693 | 66.0354 | 0.1260 | 1.4327 | 14.8938 | 181,040 | Liq | −114.04° F. |
| 53 | Water | 51.70 | 14.693 | 19.8239 | 0.0394 | 0.0948 | 20.2336 | 245,948 | Liq | −160.25° F. |
| 54 | Water | 51.80 | 24.693 | 19.9498 | 0.0396 | 0.1232 | 20.2336 | 245,948 | Liq | −187.56° F. |
| 55 | Water | 76.07 | 14.693 | 44.2041 | 0.0860 | 0.3176 | 20.2336 | 245,948 | Liq | −135.89° F. |

TABLE 2

Plant Performance Summary
Ammonia/Water Simple Boiler, Fixed Inlet Pressure

| | | | | |
|---|---|---|---|---|
| Heat in | 5,182.25 | kW | 1,455.68 | Btu/lb |
| Heat rejected | 4,190.64 | kW | 1,177.14 | Btu/lb |
| Turbine enthalpy Drops | 1,036.70 | kW | 291.21 | Btu/lb |
| Gross Generator Power | 988.55 | kW | 277.68 | Btu/lb |
| Process Pumps (−12.67) | −50.88 | kW | −14.29 | Btu/lb |
| Cycle Output | 937.66 | kW | 263.39 | Btu/lb |

TABLE 2-continued

Plant Performance Summary
Ammonia/Water Simple Boiler, Fixed Inlet Pressure

| | | | | |
|---|---|---|---|---|
| Other Pumps and°Fans (−4.42) | −17.69 | kW | −4.97 | Btu/lb |
| Net Output | 919.98 | kW | 258.42 | Btu/lb |
| Gross Generator Power | 988.55 | kW | 277.68 | Btu/lb |
| Cycle Output | 937.66 | kW | 263.39 | Btu/lb |
| Net Output | 919.98 | kW | 258.42 | Btu/lb |
| Net thermal efficiency | 17.75% | | | |

TABLE 2-continued

Plant Performance Summary
Ammonia/Water Simple Boiler, Fixed Inlet Pressure

Second Law Limit                31.47%
Second Law Efficiency           56.42%

Overall Heat Balance (Btu/lb)

Heat In: Source + pumps = 1,455.68 + 12.67 = 1,468.35
Heat Out: Turbines + condenser = 291.21 + 1,177.14 = 1,468.35

Figure 3:
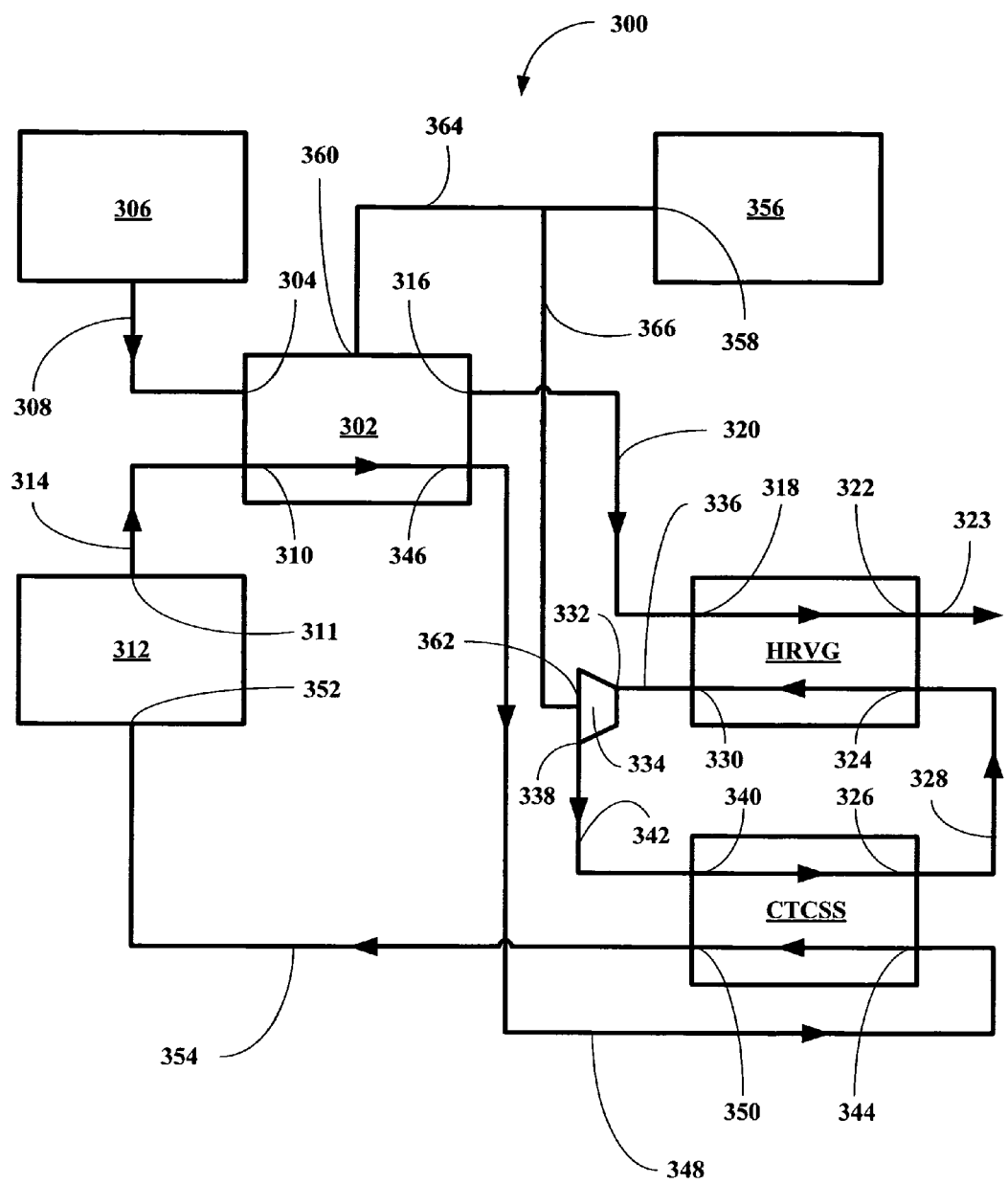
FIG. 3 depicts a preferred system of this invention for extracting additional work from an internal combustion engine.

Referring now to FIG. 3, a preferred embodiment of the heat utilization system of this invention, generally 300, is shown to include an internal combustion engine 302 having a fuel inlet 304 connected to a fuel reservoir 306 via fuel line 308 and a coolant inlet 310 connected to a coolant outlet 311 of a coolant system 312 via coolant line 314. The engine 302 also includes an exhaust outlet 316 connected to an exhaust inlet 318 of a heat recovery vapor generator HRVG via an exhaust line 320. The HRVG also includes an exhaust vent 322 connected to a vent line 323 for venting the cooled exhaust gas to the surroundings. The HRVG also includes a liquid working fluid inlet 324 connected to a liquid working fluid outlet 326 of a condensation thermal compression subsystem CTCSS via a liquid working fluid line 328. The HRVG also includes a vapor working fluid outlet 330 connected to a turbine inlet 332 of a turbine 334 via a vapor working fluid line 336. The turbine 334 also includes a turbine outlet 338 connected to a spent working fluid inlet 340 of the CTCSS via a spent working fluid line 342. The CTCSS also includes a hot coolant inlet 344 connected to a hot coolant outlet 346 of the engine 302 via a hot coolant line 348. The CTCSS also includes a cooled coolant outlet 350 connected to a coolant inlet 352 of the cooling system 312 via a coolant return line 354. The system 300 also includes a power output unit 356 having a power inlet 358 connected to a engine power outlet 360 and to a turbine power outlet 362 via power lines 364 and 366.

The system 300 operates by first supplying fuel from the reservoir 306 to the engine 302 via the fuel line 308. Fuel is combusted in the engine 302 producing exhaust gases which are forwarded to the HRVG via the exhaust line 320. While the exhaust gases carry away thermal energy, the engine also generated electrical energy which is forwarded to the power output unit 356 via an electric line 364. The engine 302 is also cooled by a coolant supplied from a cooling system 312 via a coolant line 314. The HRVG is connected to the CTCSS via liquid line 328 which supplies a stream of a liquid or fully condensed multi-component working fluid to the HRVG. The HRVG places the liquid working fluid stream in heat exchange relationship in multiple stages with the exhaust gases resulting in cooled exhaust gases and a fully vaporized and preferably superheated working fluid vapor stream. The vapor stream is then forwarded to the turbine via the vapor line 336, where a portion of its thermal energy is converted to electrical energy which is forwarded to the power out unit 356 via the electrical line 366. The spent working fluid is then forwarded to the CTCSS where it is fully condensed to from the liquid working fluid. The CTCSS utilizes heat from the hot coolant leaving the engine 302 as a source of heat in the condensation process. The arrows in FIG. 3 show the flow direction of the various streams and energy utilized and produced in the system. It should be noted that the cooling system forms a closed loop and does the working fluid cycle.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A system comprising:
an internal combustion engine including a cooling system,
a heat recovery vapor generator (HRVG) connected to an exhaust of the engine and adapted to utilize heat in exhaust gases produced by the internal combustion engine to fully vaporize a fully condensed multi-component working fluid stream,
a turbine connected to the HRVG for converting a portion of thermal energy in the fully vaporized multi-component working fluid stream to a usable form of energy to form a spent multi-component working fluid stream, and
a condensation thermal compression subsystem (CTCSS) connected to the turbine and to the cooling system, where the CTCSS comprises a plurality of heat exchangers, at least two pumps, a separator, at least one throttle valve, and a plurality of mixing and combining valves, where the CTCSS is adapted to fully condense the spent multi-component working fluid stream to form the fully condensed working fluid stream utilizing heat from a cooling system stream, transferring heat between a plurality of stream comprising three different compositions of the multi-component working fluid and transferring heat to external coolant streams to form fully condensed streams including the fully condensed multi-component working fluid stream.

2. The system of claim 1, further comprising a plurality of internal combustion engines, where the exhausts of all of the engines are combined and forwarded to the HRVG and the hot coolant from the cooling systems are combined and sent to the CTCSS to assist in the condensation thermal compression process.

3. The system of claim 1, wherein the HRVG is a multi-stage heat exchanger.

4. The system of claim 1, wherein the HRVG superheats the fully vaporized multi-component working fluid.

5. The system of claim 1, wherein the multi-component fluid comprises at least one higher boiling component and at least one lower boiling component.

6. The system of claim 1, wherein the multi-component fluid is selected from the group consisting of an ammonia-water mixture, a mixture of two or more hydrocarbons, a mixture of two or more freons, and a mixture of hydrocarbons and freons.

7. The system of claim 1, wherein the multi-component fluid comprises a mixture of water and ammonia.

8. An apparatus comprising:
an internal combustion engine having an exhaust system and a cooling system;
a heat recovery vapor generator (HRVG) connected to the exhaust system and adapted to transfer a portion of heat in engine exhaust gases produced by the internal combustion engine to fully vaporize a fully condensed multi-component working fluid;
a turbine connected to the HRVG and designed to convert a portion of heat from the fully vaporized multi-component working fluid to a usable form of energy to form a spent multi-component working fluid stream; and
a condensation thermal compression subsystem (CTCSS) connected to the turbine and to the cooling system, where the CTCSS comprises a plurality of heat exchangers, at least two pumps, a separator, at least one throttle valve, and a plurality of mixing and combining valves, where the CTCSS is adapted to fully condense the spent multi-component working fluid stream to form the fully condensed working fluid stream utilizing heat from a cooling system stream, transferring heat between a plurality of stream comprising three different compositions of the multi-component working fluid and transferring heat to external coolant streams to form fully condensed streams including the fully condensed multi-component working fluid stream.

9. The apparatus of claim 8, wherein the HRVG comprises a plurality of heat exchange stages which successively heat the fully condensed working fluid until it is fully vaporized.

10. The apparatus of claim 8, wherein the HRVG comprises a plurality of heat exchange stages which successively heat the fully condensed working fluid until it is fully vaporized and superheated.

11. The apparatus of claim 8, wherein the multi-component fluid comprises at least one higher boiling component and at least one lower boiling component.

12. The apparatus of claim 8, wherein the multi-component fluid is selected from the group consisting of an ammonia-water mixture, a mixture of two or more hydrocarbons, a mixture of two or more freons, and a mixture of hydrocarbons and freons.

13. The apparatus of claim 8, wherein the multi-component fluid comprises a mixture of water and ammonia.

14. A method, for converting a portion of waste thermal energy generated by an internal combustion engine into a usable form of energy, comprising the steps of:
  combusting a fuel in an internal combustion engine including an exhaust system and a cooling system;
  vaporizing a fully condensed working fluid stream, with heat from an exhaust gas stream from the exhaust system, in a heat recovery vapor generator (HRVG) including a plurality of heat exchange stages to form a vaporized working fluid stream;
  converting a portion of thermal energy in the vaporized working fluid stream to a usable form of energy in a turbine to form a spent working fluid stream; and
  passing the spent working fluid stream through a condensation thermal compression subsystem (CTCSS), where the CTCSS comprises a plurality of heat exchangers, at least two pumps, a separator, at least one throttle valve, and a plurality of mixing and combining valves, where the CTCSS is adapted to fully condense the spent multi-component working fluid stream to form the fully condensed working fluid stream utilizing heat from a cooling system stream, transferring heat between a plurality of stream comprising three different compositions of the multi-component working fluid and transferring heat to external coolant streams to form fully condensed streams including the fully condensed multi-component working fluid stream.

15. The method of claim 14, further comprising the step of: superheating the vaporized working fluid stream in the HRVG prior to the converting step.

16. The method of claim 14, wherein the working fluid comprises a multi-component fluid.

17. The method of claim 16, wherein the multi-component fluid comprises at least one higher boiling component and at least one lower boiling component.

18. The method of claim 16, wherein the multi-component fluid is selected from the group consisting of an ammonia-water mixture, a mixture of two or more hydrocarbons, a mixture of two or more freons, and a mixture of hydrocarbons and freons.

19. The method of claim 16, wherein the multi-component fluid comprises a mixture of water and ammonia.

20. The method of claim 14, wherein the passing step comprises the steps of:
  forwarding the spent working fluid a first heat exchanger where a portion of its heat is transferred to a first portion of a heated, leaner working fluid stream to form a first partially vaporized, leaner working fluid stream and a cooled working fluid stream;
  combining the first partially vaporized, leaner working fluid stream with a second partially vaporized, leaner working fluid stream to form a combined, partially vaporized leaner working fluid stream,
  separating the combined partially vaporized leaner working fluid stream in the separator to produce a rich vapor working fluid stream and a lean liquid working fluid stream;
  passing the lean liquid working fluid stream through a throttle valve where its pressure is adjust to be the same or substantially the same as a pressure of the cooled working fluid stream;
  combining the pressure adjusted, lean liquid working fluid stream with the cooled working fluid stream to form a leaner working fluid stream;
  forwarding the leaner, working fluid stream into a heat exchange relationship with a first portion of a pressurized liquid, leaner working fluid stream to form the heated, leaner working fluid stream and a partially condensed leaner, working fluid stream;
  condensing the partially condensed, leaner working fluid stream with an external coolant stream in a condenser to form a fully condensed or liquid, leaner working fluid stream;
  pressurizing the liquid, leaner working fluid stream to form a pressurized liquid, leaner working fluid steam;
  dividing the pressurized liquid, leaner working fluid steam into the first portion of the pressurized liquid, leaner working fluid stream and a second portion of the pressurized liquid, leaner working fluid stream;
  combining the second portion of the pressurized liquid, leaner working fluid stream with the rich vapor working fluid stream to form a partially condensed working fluid stream;
  condensing the partially condensed working fluid stream with an external coolant stream in a high pressure condenser to form the fully condensed, lower pressure working fluid stream;
  pumping the fully condensed, lower pressure working fluid stream in a feed pump to form the fully condensed working fluid, where its pressure is raised to a desired high pressure level; and
  forwarding the fully condensed working fluid stream to the HRVG.

* * * * *